United States Patent
Fink

(10) Patent No.: US 9,266,303 B2
(45) Date of Patent: Feb. 23, 2016

(54) GRID TYPE FIBER COMPOSITE STRUCTURE AND METHOD OF MANUFACTURING SUCH GRID TYPE STRUCTURE

(71) Applicant: AIRBUS HELICOPTERS DEUTSCHLAND GMBH, Donauworth (DE)

(72) Inventor: Axel Fink, Donauworth (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 27 days.

(21) Appl. No.: 14/101,458

(22) Filed: Dec. 10, 2013

(65) Prior Publication Data

US 2014/0170372 A1    Jun. 19, 2014

(30) Foreign Application Priority Data

Dec. 14, 2012   (EP) .................................... 12400055

(51) Int. Cl.
*B32B 3/12* (2006.01)
*B29C 70/68* (2006.01)
*B29D 24/00* (2006.01)

(52) U.S. Cl.
CPC . *B32B 3/12* (2013.01); *B29C 70/68* (2013.01); *B29D 24/005* (2013.01); *Y10T 29/49826* (2015.01); *Y10T 428/24149* (2015.01); *Y10T 428/24157* (2015.01)

(58) Field of Classification Search
CPC ............... Y10T 428/24149; Y10T 428/24157; Y10T 428/24165; B32B 3/18; B32B 3/20; B32B 3/22; B32B 3/12; E04D 3/351
See application file for complete search history.

(56) References Cited

U.S. PATENT DOCUMENTS

| | | | | |
|---|---|---|---|---|
| 2,874,652 | A | * | 2/1959 | Wilson .................... E04D 3/351 52/419 |
| 3,391,511 | A | * | 7/1968 | Leighton .............. B29D 24/005 428/118 |
| 4,012,549 | A | | 3/1977 | Slysh |
| 4,052,523 | A | | 10/1977 | Rhodes et al. |
| 2004/0140049 | A1 | | 7/2004 | Puriefoy et al. |
| 2006/0257612 | A1 | * | 11/2006 | Rakutt ...................... B32B 3/18 428/54 |
| 2009/0038744 | A1 | | 2/2009 | Lee et al. |

FOREIGN PATENT DOCUMENTS

| | | |
|---|---|---|
| DE | 102009053053 | 5/2011 |
| EP | 0948085 | 10/1999 |
| WO | 2005049298 | 6/2005 |

OTHER PUBLICATIONS

Extended European Search Report for EP 12400055.5, Completed by the European Patent Office, Dated May 28, 2013, 7 Pages.

* cited by examiner

*Primary Examiner* — Mark Ruthkosky
*Assistant Examiner* — Julia L Rummel
(74) *Attorney, Agent, or Firm* — Brooks Kushman P.C.

(57) ABSTRACT

The invention is related to a grid type fiber composite structure (1) comprising a grid of polygon cell modules (5) comprising at least three substantially u-shaped ribs made of fiber composite layer (8, 13) and a foam core (9) provided inside each cell module (5) for support of said u-shaped ribs. Said foam core (9) is along a base essentially in line with one of said flat cap sections (11, 12). At least one layer of strip (2, 3) is provided outside said flat cap sections (11, 12) and a skin sheet (4) is unilaterally attached to said cell modules (5) essentially in line with one of said flat cap sections (11, 12). The invention is as well related to a method of manufacturing such a grid type fiber composite structure (1).

12 Claims, 5 Drawing Sheets

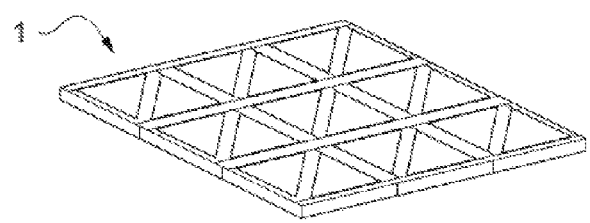
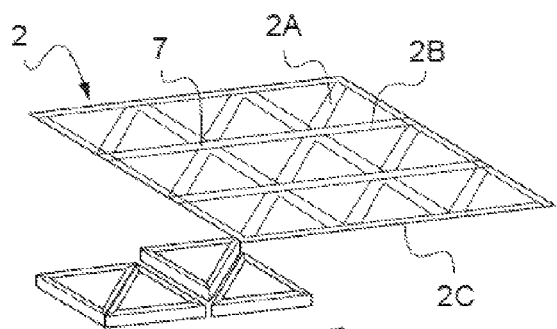
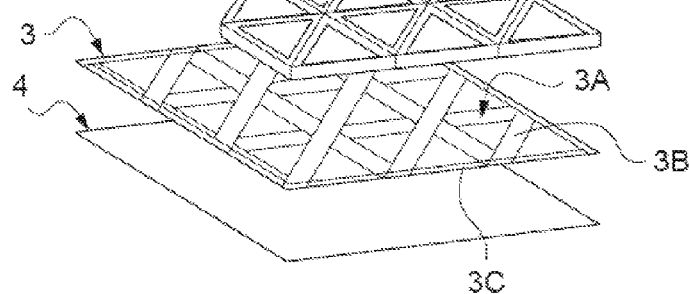
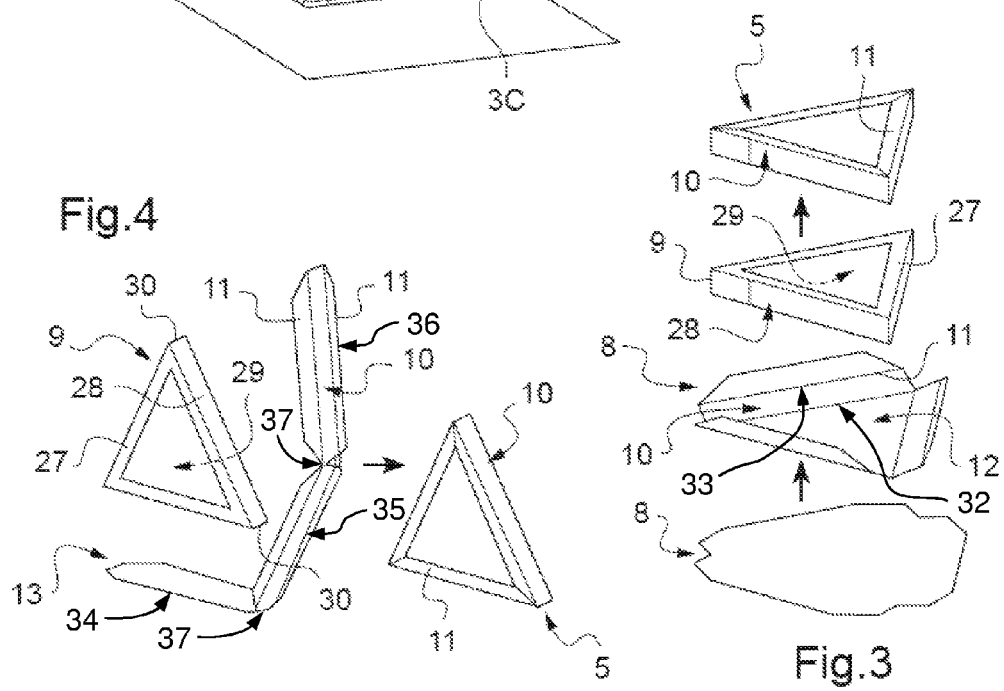

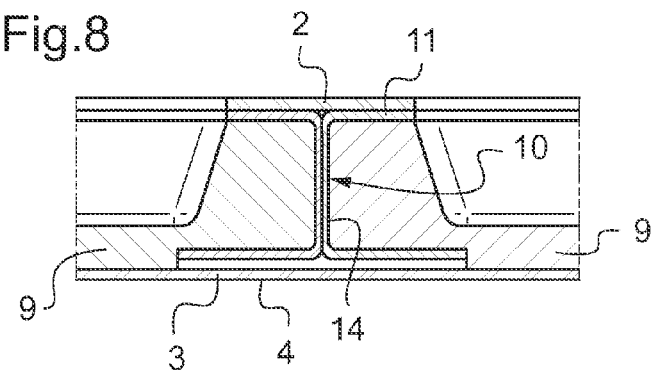
Fig.8
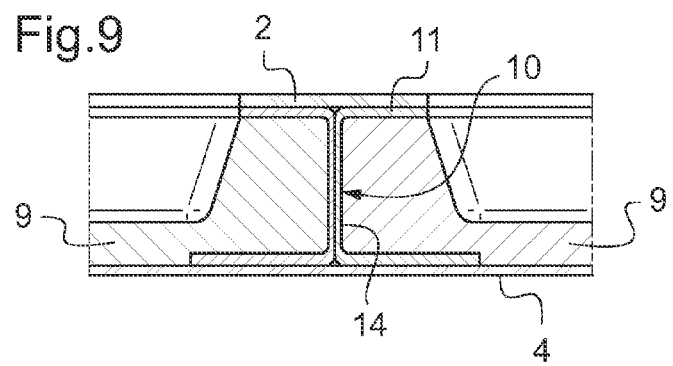
Fig.9
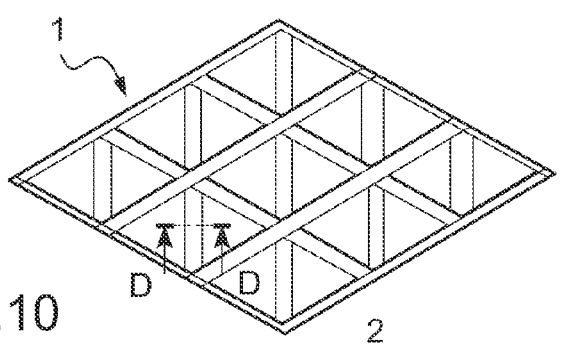
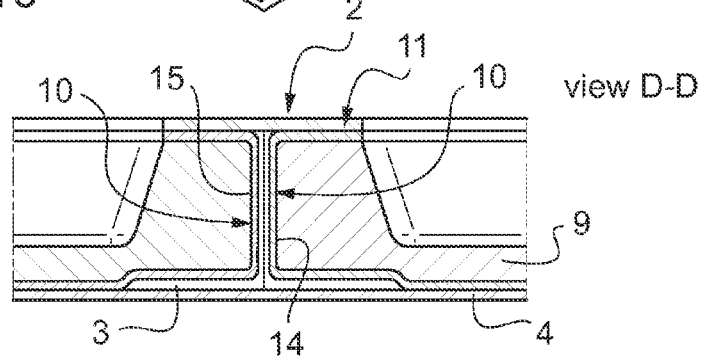
Fig.10

GRID TYPE FIBER COMPOSITE STRUCTURE AND METHOD OF MANUFACTURING SUCH GRID TYPE STRUCTURE

CROSS REFERENCE TO RELATED APPLICATION

This application claims priority to European patent application No. 12 400055.5 filed Dec. 14, 2012, the disclosure of which is incorporated in its entirety by reference herein.

BACKGROUND OF THE INVENTION (1) Field of the Invention

The invention is related to a grid type fiber composite structure, particularly to a transverse force resilient grid type fiber composite structure for local load introduction, and a method of manufacturing such grid type structures.

(2) Description of Related Art

The document U.S. Pat. No. 3,391,511 describes a lightweight structure having a honeycomb interior. The structure includes cell units having outer and inner components, wherein the interiors of the cell units may contain air, or other gas, or may be filled with lightweight material, e.g. polyvinyl chloride foam. The perimeter of each outer component is formed by a wall having faces that comprise corrugations with flat crests extending from end to end of a corresponding cell unit. One end of each outer component is open and encircled by an intermittent flange and the other end is closed by an end wall which is integral with the wall. Into the open end of each outer component, an inverted inner component is inserted, which is generally similar to the corresponding outer component, but with a perimeter wall which is plain and sufficiently smaller to fit inside the outer component. The perimeter wall is bonded to the wall of the outer component by epoxy resin. The cell units are coated with epoxy resin and assembled in close relationship, i.e. with their corrugation crests abutting respective corrugation crests of neighboring cells, on a first sheet of felted glass fibers that is also soaked in epoxy resin and laid on a top surface of a support. A second sheet of felted glass fiber soaked in epoxy resin is laid upon the assembly. The epoxy resin forms bonds between the different components of the lightweight structure.

The document US2004140049 A1 discloses a method of manufacturing a hollow section grid-stiffened panel comprising a tool having a surface. The stiffened skin composite panel is preassembled comprising laminating a composite outer skin on the surface, placing a separator outer layer on the composite outer skin, and laminating a composite stiffener on the mandrel, the mandrel being positioned on the separator layer, wherein the separator layer separates the stiffener and the mandrel from the outer composite skin. The preassembled outer skin composite panel is cured on the tool. The separator layer and mandrel are removed from the preassembled stiffened skin composite panel. The stiffened skin composite panel is reassembled, comprising applying an adhesive between the composite outer skin and the composite stiffener. The reassembled stiffener skin composite panel is cured on the tool to bond the stiffener skin to the outer skin.

The document US2009038744 A1 discloses a cellular composite structure with a grid having groups of angularly intersecting ribs. The ribs of each group are oriented substantially in the same direction to each other and angularly oriented from the other rib groups. An additional rib defines a composite structure outer perimeter wall and can be differently angularly oriented from the other ribs. A contiguous rib wall is created by segments of ribs defined by rib intersections. The contiguous rib wall bounds a cavity. A multilayer sheet cap member with extending walls to engage the contiguous rib wall is positioned within the cavity. The engagement walls extend from individual sheet perimeter portions angularly oriented to the sheet. The ribs and cap member have pre-impregnated resin. Heating the cap member and ribs activates the resin and co-cures the composite structure.

The document EP 0 948 085 A2 relates to high stiffness parabolic structures utilizing integral reinforced grids and more particularly to a high stiffness parabolic structure utilizing an integral reinforcing grid which includes a skin sheet having a generally parabolic shape; and a grid attached to the skin sheet and having a triangular isogrid pattern.

The document DE 10 2009 053 053 A1 discloses a component with a rib structure provided with ribs that run along polygon edges, and including laminar grid-like polygons that are arranged next to each other. Two plate-shaped fiber composite structures containing carbon fibers represent the rib structure, where one of the fiber composite structures is fastened at a flat side of the other fiber composite structure and formed based on a flat fiber composite structure by inserting sections into an interior of a polygon and transforming produced structure projections to form the rib structure.

The document U.S. Pat. No. 4,052,523 A discloses a lattice type structural panel utilizing the unidirectional character of filamentary epoxy impregnated composites to produce stiff lightweight structural panels for use in constructing large area panels for space satellites and the like.

The document U.S. Pat. No. 4,012,549 A discloses a grid structure of I-beam members arranged in an integral repeating pattern of substantially equilateral triangles integral with a skin sheet covering the structure. The beam webs are filled with advanced composite materials comprising high-strength fibers in a supporting matrix. Preferably, the fibers run parallel to the beam webs for a structure of improved stiffness with a high strength-to-weight ratio.

BRIEF SUMMARY OF THE INVENTION

It is an object of the invention to provide a grid type fiber composite structure, particularly a transverse force resilient grid type fiber composite structure for local load introduction with further improved stiffness with a high strength-to-weight ratio. It is a further object of the invention to provide a method for automated manufacturing of such grid type fiber composite structures.

The solution is provided with a grid type fiber composite structure, particularly with a transverse force resilient grid type fiber composite structure for local load, and with a method of manufacturing such grid type fiber composite structures.

According to the invention a grid type fiber composite structure, particularly a rectangular grid type fiber composite structure, is pressure, shear- and/or transverse force resilient. The inventive grid type fiber composite structure comprises longitudinal stiffening elements oriented in at least two directions with a grid of polygon cell modules.

Each cell module comprises two parallel polygon surfaces connected by peripheral surfaces perpendicular to said two polygon surfaces, at least one of said two parallel polygon surfaces being essentially planar or curvilinear to allow as well a spherical grid. Three or four substantially u-shaped ribs of each cell module have each a transverse web section corresponding to one of said peripheral surfaces and two flat cap sections, said two flat cap sections being connected to said transverse web section and each of said two flat cap sections extending at least partially along one of said respective polygon surfaces.

For each cell module one foam core is provided inside said at least three substantially u-shaped ribs for support of said transverse web sections and said flat cap sections. Said foam core is delimited by said two parallel polygon surfaces and said peripheral surfaces and said foam core is in supporting contact with said transverse web sections and said flat cap sections of each rib. Said polygon cell modules are stringed together along entire transverse web sections of equal length, i. e. adjacent transverse web sections cover each other completely in longitudinal and transversal direction without allowing any offset along their entire transverse web sections.

Layers of strip are provided outside said flat cap sections in at least one of said polygon surfaces, said layers of strip being aligned with ribs in one direction of said longitudinal stiffening elements, at least one of said flat cap sections being allocated between said at least one layer of strip and said foam core. Said longitudinal stiffening elements are defined by the grid wise mounted cell modules with the layers of strip along the ribs. A skin sheet is unilaterally attached either to said layers of strip and/or to said flat cap sections and/or to said base of said foam core of said longitudinal stiffening elements to complete the inventive grid type fiber composite structure.

The essentially planar or spherical inventive grid type structure alleviates specific short comings of conventional grid structures. The inventive grid type structure is particularly suitable for either planar or spherical shells loaded via selected points by transverse forces, such shells being particularly suitable for floor panels of aircrafts. The inventive grid type structure allows a modular assembly from triangular or rectangular cell modules as single grid cell modules. The polygon foam cores of the preferably triangular cell modules are manufactured by automated procedures.

The foam core stiffens said transverse web sections and said flat cap sections of said u-shaped ribs. Said preferably triangular cell modules are stringed together alongside each other to result in a rib-structure with shear stiff and shear resistant transverse web sections of fiber composite materials additionally stabilised by the respective inner foam cores to avoid buckling of the transverse web sections of the ribs. Said shear stiff and shear resistant transverse web sections correspond to the respective lateral faces of the preferably triangular foam cores allowing an optimized introduction of transversal forces at specific points and pressure resilience.

The respective inner foam cores of the preferably triangular cell modules stabilise as well said skin sheet of the essentially planar or spherical inventive grid type structure. According to the invention said flat cap sections of said ribs are covered respectively by an upper layer of strips and/or a layer of congruent lower strips opposed to the upper layer. The strips are unidirectional along each of said longitudinal stiffening elements for an improved shear stiff connection of said ribs.

According to a preferred embodiment of the invention load introduction elements with radial lugs are provided at intersections of the grid wise mounted cell modules. Said load introduction elements allow high resilience at little wear of the inventive grid type structure. Any loads on the load introduction elements are distributed equally to the radial lugs and to the shear stiff connection with the transverse web sections for a joining technique with excellent resiliency, particularly in cases of loads acting perpendicular to the shell of the inventive essentially planar grid type structure.

According to a further preferred embodiment of the invention a reduced thickness of the core perpendicular to said transversal web sections of said ribs at the intersections compensates the respective material thicknesses of said load introduction elements and/or the strips, preferably for a smooth surface at the downside of the inventive grid type structure.

According to a further preferred embodiment of the invention the skin sheet is integrated or mechanical releasable fixed to the longitudinal stiffening elements at the intersections.

According to a further preferred embodiment of the invention each of said preferably triangular cell modules are pre-assembled from the foam core and the fiber composite layer.

According to a further preferred embodiment of the invention said fiber composite layer is textured to respective tripartite or quadripartite layouts for improved adaption to the triangular foam core.

According to a further preferred embodiment of the invention said fiber composite layer is a dry semi-finished part or a semi-finished part pre-impregnated with resin.

According to a further preferred embodiment of the invention the foam core is tray-shaped on one of the polygon surfaces and planar or spherical on an opposed surface to said one surface.

According to a further preferred embodiment of the invention a tripartite fiber composite layer comprises three interconnected sections with two of said interconnected sections pivoted relative to a central section of said three interconnected sections allowing equal orientation of the fibers of the fiber composite layer sheathing the foam core of said triangular cell module. An additional advantage of this alternative of the inventive grid element is continuity of the fiber composite layer at two of the three corners of the triangular cell modules, allowing continuous coupling of the transverse force shear between adjacent triangular cell modules.

According to a further preferred embodiment of the invention said three ribs are made of one quadripartite fiber composite layer comprising three lateral sections connected alongside a triangular central section said three lateral sections being pivotable relative to said triangular central section allowing equal orientation of the fibers of the fiber composite layer sheathing the foam core of said triangular cell module, allowing continuity of the fiber composite layer at two of the three corners of the triangular cell modules and allowing continuous covering along the planar or spherical surface of the foam core inside the triangular cell modules.

According to a further preferred embodiment of the invention said load introduction elements are made of metal or of fiber composite.

According to a preferred embodiment of the invention a method of manufacturing a grid type fiber composite structure with longitudinal stiffening elements oriented in at least two directions comprises the steps of providing peripheral ribs of textured fiber composite layers and polygon, preferably triangular foam cores with peripheral supports, said polygon foam cores being delimited by two parallel polygon surfaces connected by peripheral surfaces perpendicular to said two polygon surfaces.

Each of said peripheral supports of said polygon foam cores are sheathed with at least three substantially u-shaped ribs made of said textured fiber composite layers to provide polygon cell modules, each of said ribs having a transverse web section corresponding to one of said peripheral surfaces and two flat cap sections connected to said transverse web section, each of said two flat cap sections extending at least partially along one of said respective polygon surfaces. The polygon cell modules are stringed together along entire transverse web sections of equal length to form a grid. Load introduction elements are inserted into the grid at intersections between at least four cell modules.

Subsequently layers of strip are provided. Said layers of strip are attached outside said flat cap sections in at least one of said polygon surfaces, each of said layers of strip being aligned with ribs in one direction of said longitudinal stiffening elements with at least one of said flat cap sections being allocated between said at least one layer of strip and said foam core. Said longitudinal stiffening elements are provided by grid wise mounting the cell modules to the layers of strip along the unidirectional ribs.

Finally a skin sheet is provided and mounted onto said longitudinal stiffening elements. The lightweight foam core of the inventive grid type structure serves with its triangular shape as production means for one single triangular cell module. The simple shape of said basic triangular cell modules favours automated production at high production rates.

According to a further preferred embodiment of the invention sheathing of a foam core is accomplished by arranging horizontally said textured fiber composite layer on a resilient central stamp and on separate peripheral stamps arranged alongside said resilient central stamp. Subsequently the foam core is arranged on said textured fiber composite layer on the resilient central stamp by draping said textured fiber composite layer on the foam core to fix in advance positions for the grid structure.

The resilient central stamp is pushed along the peripheral stamps such that transversal web sections and flat cap sections of said textured fiber composite layer are pivoted by the separate peripheral die parts towards front sides of said foam core. The transversal web sections and flat cap sections of said textured fiber composite layer are pressed by means of the separate peripheral stamps towards the lateral faces for compaction of said foam core and in following steps the flat cap sections of said textured fiber composite layer are pivoted and pressed by means of upper peripheral stamps towards the top faces of said foam core.

The flat cap sections of said textured fiber composite layer are heated by means of the peripheral die parts for adhesive bond of the transversal web sections and the flat cap sections to the triangular cell module and the triangular cell module is released. The inventive method allows precast compact basic triangular cell modules allowing modular assembly by stringing together alongside the peripheral ribs of said single triangular cell modules to form the resulting grid structure.

BRIEF DESCRIPTION OF THE SEVERAL VIEWS OF THE DRAWINGS

Preferred embodiments of the invention are outlined by way of example with the following description with reference to the attached drawings.

FIG. 1 shows a top overall view of a grid type structure according to the invention;

FIG. 2 shows an exploded view of the grid type structure according to the invention, FIG. 3 shows an overall view of a triangular cell module of the grid type structure according to the invention, FIG. 4 shows an overall view of an alternative triangular cell module of the grid type structure according to the invention, FIG. 8 shows a cross sectional view through a section of a further grid type structure according to the invention, FIG. 9 shows a cross sectional view through a section of a still further grid type structure according to the invention, FIG. 10 shows a cross sectional view through a section with a load introduction element of the grid type structure according to the invention.

DETAILED DESCRIPTION OF THE INVENTION

Figure 5:
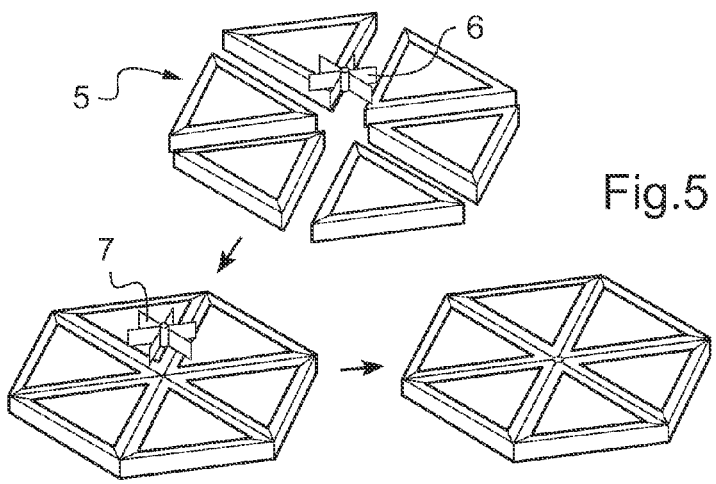
FIG. 5 shows an overall view of an assembly of triangular cell modules to a grid type structure according to the invention.

According to FIG. 1, 2 an essentially planar grid type fiber composite structure 1 comprises an upper layer 2 of intersecting strips 2a, 2b, 2c, a plurality of triangular cell modules 5, each with three ribs, a lower layer 3 of congruent intersecting strips 3a, 3b, 3c opposed to said upper layer 2 with regard to said triangular cell modules 5 and a lower planar skin sheet 4. The ribs aligned unidirectional of the cell modules 5 result in longitudinal stiffening elements oriented in three directions of the grid type fiber composite structure 1.

Each cell module 5 comprises two parallel, triangular surfaces connected and delimited by peripheral surfaces perpendicular to said two triangular surfaces.

The plurality of triangular cell modules 5 are stringed together along web sections 10 transverse with regard to said two parallel polygon surfaces of the ribs to the quadratic grid structure 1. The sizes of the upper layer 2, of the plurality of assembled open triangular cell modules 5, of the lower layer 3 and the planar skin sheet 4 correspond to each other resulting in the grid structure 1.

A load introduction element 6 is provided at an intersection of six triangular cell modules 5 below a load introduction point 7 in the upper layer 2. A mechanically mounted planar skin sheet 4 is releasable fixed to the grid structure 1. Said mechanically mounted planar skin sheet 4 is not overall supporting. The planar skin sheet 4 is made of fiber composite material or of metal.

The respective orientations and arrangements of the strips 2a, 2b, 2c of the upper layer 2 and of the congruent strips 3a, 3b, 3c of the lower layer 3 correspond to the respective orientations and arrangements of the ribs of the triangular cell modules 5, said ribs being preferably reduced in height at all of the intersections of the triangular cell modules 5 for compensation of the material thickness of the strips 2a, 2b, 2c crossing each other and correspondingly of the congruent strips 3a, 3b, 3c for plane upper and lower surfaces of the grid structure 1. At least the respective ribs at the intersection of six triangular cell modules 5 below a load introduction point 7 are adapted with their height of the respective transverse web sections 10 for compensation of the material thickness of the load introduction element 6.

According to FIG. 3 corresponding features are referred to with the references of FIG. 1, 2. Each triangular cell module 5 comprises one tray shaped foam core 9 delimited by said two triangular surfaces, said tray shaped foam core 9 being concave at the upper side of the triangular cell module 5 while being provided unilaterally with an essentially planar bottom side 29 and three lateral faces 28 along three top faces 27 as respective supports.

Each cell module 5 comprises at least three substantially u-shaped ribs each rib having the transverse web section 10 corresponding to one of said peripheral surfaces and two flat cap sections 11, 12 connected to said transverse web section 10, each of said two flat cap sections 11, 12 extending at least partially along one of said respective triangular surfaces.

A quadripartite fiber composite layer 8 is cut and textured to fit to the essentially triangular layout of the foam core 9 with a triangular base 12, one transverse web section 10 along each of the three lower hinges 32 at each of the three sides of the triangular base 12 and one upper flat cap section 11 along upper hinges 33 at each of the three upper sides of each of the three transverse web sections 10 for the provision of three substantially u-shaped ribs extending each principally along an inherent longitudinal axis of said rib.

The transverse web section 10 of each rib corresponds to one of said peripheral surfaces while each of said two flat cap sections 11, 12 extend at least partially along one of said respective polygon surfaces. The lower flat cap section 12 of each substantially u-shaped rib is integral with the triangular base 12 of said fiber composite layer 8 essentially perpendicular to said longitudinal axis and said transverse section 10. Said two flat cap sections 11, 12 are integral with opposed ends of said transverse web section 10.

The respective widths of the flat cap sections 11, 12 of the triangular cell module 5 are half of the widths of the strips 2a, 2b, 2c of the upper layer 2 with a reduction of their widths at the intersections for accommodation of the respective load introduction elements 6. The foam core 9 is made of polystyrene (PS), polymethacrylimid (PMI), polyvinyl chloride (PVC), polyurethane (PU), polypropylene (PP), polyethylene (PE), carbon.

The fiber composite layer 8 is a pre-impregnated semi-finished fiber composite, such as a tissue, or a dry semi-finished fiber composite, such as a multi-axial non-crimp fabric or a tissue. Fibers are made of aramid, carbon and/or glass.

The unilaterally tray shaped foam core 9 is sheathed by the three substantially u-shaped ribs and the triangular base 12 of the cut and textured fiber composite layer 8 to become the cell module 5. Therefore the fiber composite layer 8 is draped to the foam core 9 such that the transverse web sections 10 of the ribs cover the respective lateral faces 28 of the foam core 9, the closed bottom side 29 of the foam core 9 is covered by the triangular base 12 of the fiber composite layer 8 and the three upper flat cap sections 11 of the fiber composite layer 8 are draped around the respective top sides 27 of the ribs of the foam core 9.

According to FIG. 4 corresponding features are referred to with the references of FIG. 1-3. For three alternative ribs a tripartite fiber composite layer 13 is cut and textured to the triangular layout of the foam core 9 with three interconnected sections 34-36. Two outer sections 34, 36 of said interconnected sections 34-36 are foldable around corner hinges 37 to be fitted to cell corners 30 of the triangular foam core 9 relative to a central section 35 of said three interconnected sections 34-36, such that the three lateral faces 28 of the foam core 9 are covered by the respective transverse web sections 10 of the tripartite fiber composite layer 13.

Respective upper flat cap sections 11 of the tripartite fiber composite layer 13 are hinged along one side of the respective transverse web sections 10 of each of said three interconnected sections 34-36. Said upper flat cap sections 11 are draped around the associated top sides 27 of the ribs of the foam core 9, while three lower cap sections 11 hinged along an opposed side of the respective transverse web sections 10 of each of said three interconnected sections 34-36 of the tripartite fiber composite layer 13 are draped to the planar downside 29 of the foam core 9 to become the cell module 5.

According to FIG. 5 corresponding features are referred to with the references of FIG. 1-4. Six triangular cell modules 5 are assembled to an essentially planar grid with a load introduction element 6 at an intersection of said ribs below a load introduction point 7.

Figure 6:
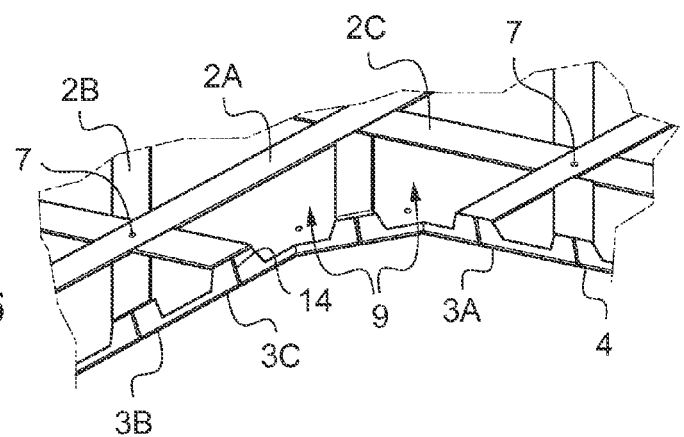
FIG. 6 shows a cross sectional view of the grid type structure according to the invention.
Figure 7:
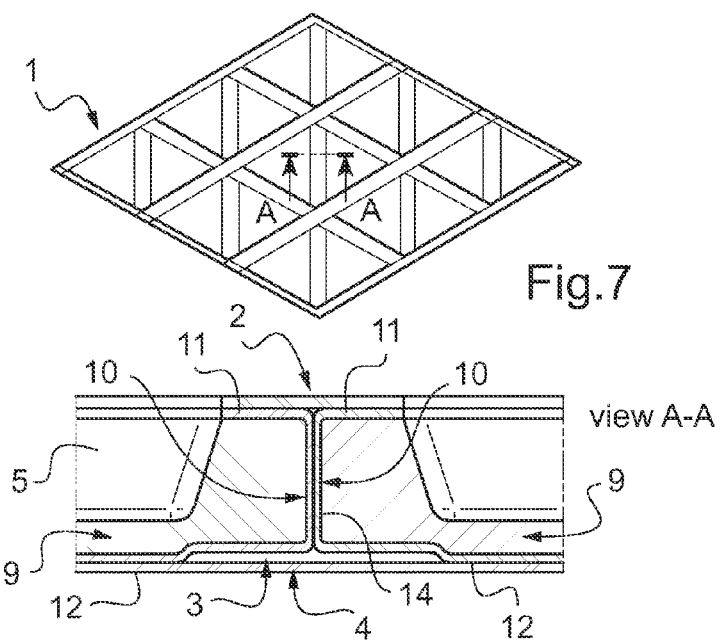
FIG. 7 shows a cross sectional view through a section of the grid type structure according to the invention.

According to FIG. 6, 7 corresponding features are referred to with the references of FIG. 1-5. The intersecting strips 2a, 2b, 2c of the upper layer 2 are attached to the respective upper flat cap sections 11 of the fiber composite layers 8 on top of two adjacent peripheral ribs of the triangular cell modules 5 and the congruent intersecting strips 3a, 3b, 3c of the lower layer 3 are attached to the respective bases 12 of the fiber composite layers 8 covering the downsides of the adjacent triangular cell modules 5. Each of the intersecting strips 2a, 2b, 2c and each of the congruent intersecting strips 3a, 3b, 3 are aligned with the unidirectional ribs of the cell modules 5 to result in the longitudinal stiffening elements.

Between the congruent intersecting strips 3a, 3b, 3c of the opposed layer 3 the respective foam cores 9 of the triangular cell modules 5 are attached to the respective bases 12 of fiber composite layers 8, said bases 12 being covered by the lower planar skin sheet 4. The fiber composite layers 8 of the ribs of the triangular cell modules 5 are attached to each other along the transverse web sections 10 of adjacent ribs to a combined shear stiff grid 14. The skin sheet 4 is attached to the bottom of grid 14 to the grid structure 1.

According to FIG. 8 corresponding features are referred to with the references of FIG. 1-7. The intersecting strips 2a, 2b, 2c of the upper layer 2 are attached to the respective upper flat cap sections 11 of the alternative tripartite fiber composite layers 13 on two adjacent peripheral ribs of the triangular cell modules 5 and the congruent intersecting strips 3a, 3b, 3c of the opposed layer 3 are attached to the respective lower flat cap sections 12 of the alternative tripartite fiber composite layers 13 at the downsides of the adjacent triangular cell modules 5. Between the lower flat cap sections 12 the foam cores 9 of the triangular cell modules 5 are covered by the lower planar skin sheet 4. The alternative tripartite fiber composite layers 13 sheathing the foam core 9 are attached to each other along the transverse web sections 10 of adjacent peripheral ribs to the combined shear stiff grid 14 of the grid structure 1.

According to FIG. 9 corresponding features are referred to with the references of FIG. 1-8. The intersecting strips 2a, 2b, 2c of the upper layer 2 are attached to the respective upper flat cap sections 11 of the alternative tripartite fiber composite layers 13 on two adjacent peripheral ribs of the triangular cell modules 5. The respective lower flat cap sections 12 of the alternative tripartite fiber composite layers 13 are attached to the downsides of the foam cores 9 of the triangular cell modules 5 and to the lower planar skin sheet 4. The alternative tripartite fiber composite layers 13 sheathing the triangular cell modules 5 are attached to each other along the transverse web sections 10 of adjacent peripheral ribs to the combined shear stiff grid rib web 14 of the grid structure 1.

According to FIG. 10 corresponding features are referred to with the references of FIG. 1-9. The intersecting strips 2a, 2b, 2c of the upper layer 2 are attached to the respective upper flat cap sections 11 of the fiber composite layers 8 of two adjacent peripheral ribs of the open triangular cell modules 5 and the congruent intersecting strips 3a, 3b, 3c of the opposed layer 3 are attached to the respective triangular bases 12 of the fiber composite layers 8 at the downsides of the adjacent triangular cell modules 5. Between the congruent intersecting strips 3a, 3b, 3c of the opposed layer 3 the respective foam cores 9 of the triangular cells 5 are attached to the bases 12 of the fiber composite layers 8, said bases 12 being covered by the lower planar skin sheet 4. The fiber composite layers 8 sheathing the triangular foam cores 9 are attached to a lug 15 of a load introduction element 6 along the transverse web sections 10 of adjacent peripheral ribs.

Figure 11:
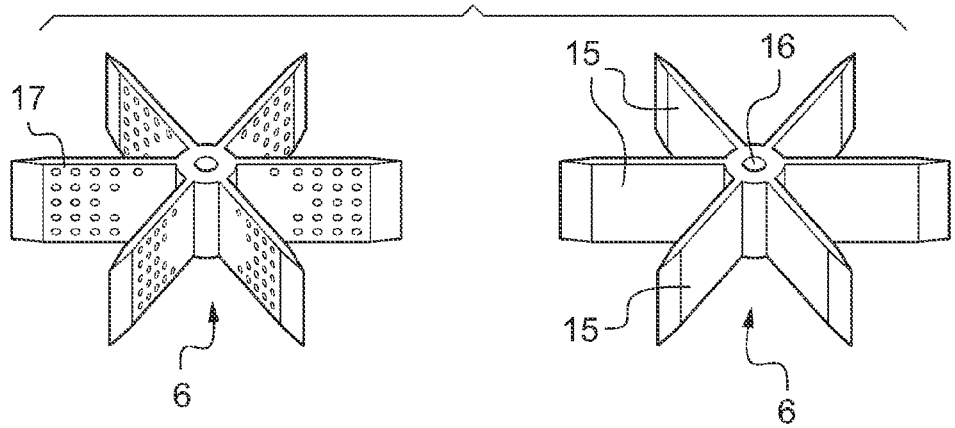
FIGS. 11, 12 show over all views of alternative load introduction elements of the grid type structure according to the invention.
Figure 12:
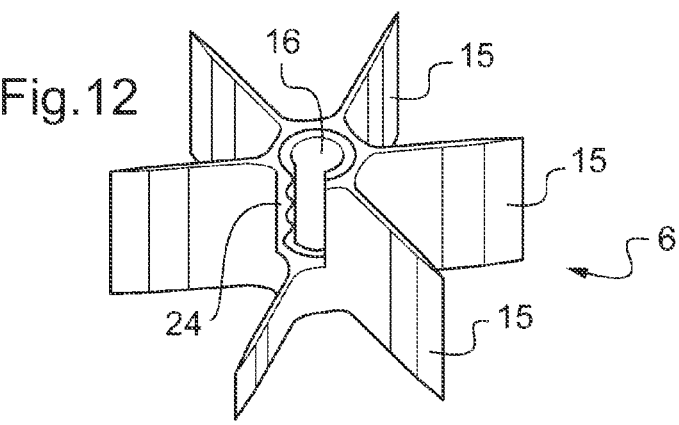
Figure 13:
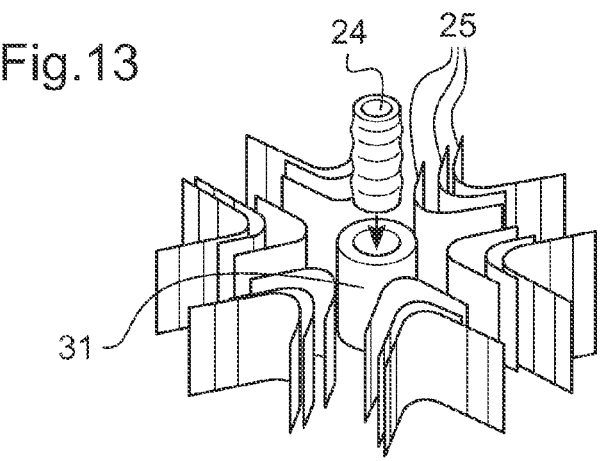
FIG. 13 shows an exploded view of a load introduction element for the grid type structure according to the invention.
Figure 14:
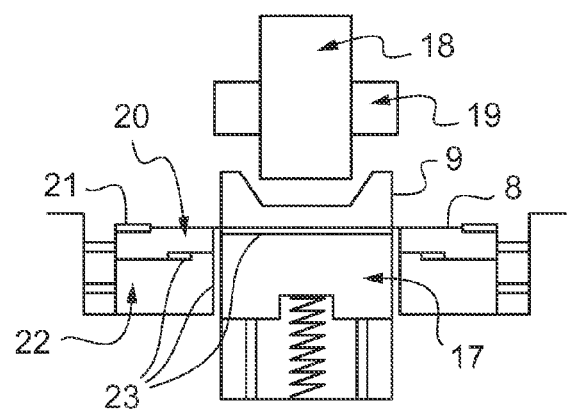
FIGS. 14-17 show respectively a cross sectional view of a method of production of triangular cells for a grid type structure according to the invention.
Figure 15:
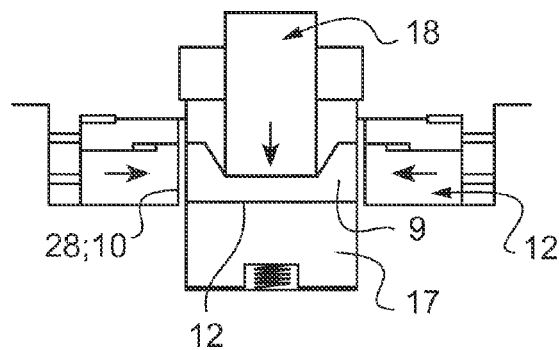
Figure 16:
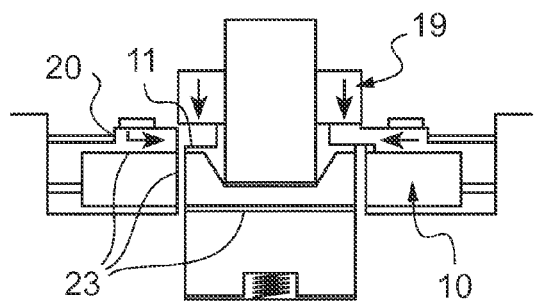
Figure 17:
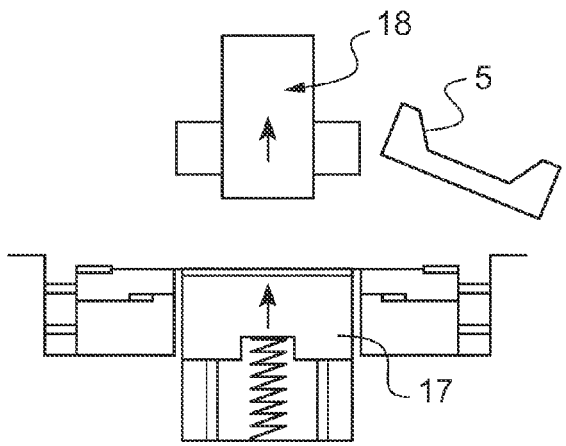

According to FIGS. 11, 12 and 13 corresponding features are referred to with the references of FIG. 1-10. The load introduction element 6 comprises a central body 16 with six 0.1-1 mm thin radial lugs 15 symmetric with regard to said central body 16. The load introduction element 6 can be made of metal or of composite. For a composite element, the central body 16 is provided with a metallic insert 24 as interface for a load connection element, such as a screw, rivet or bolt. The metallic insert 24 with a corrugated outer casing is mounted with form lock into the central body 16.

Each of the six thin radial lugs 15 is provided with two essentially planar surfaces resulting in twelve interfaces of the load introduction element 6 with the transverse web sections 28 of the ribs of the triangular cells 5. The material thickness of each of the six thin radial lugs 15 is decreasing with increasing distance from the central body 16. For a composite load introduction element 6, the radial lugs 15 are made of several composite plies 25, the plies preferably featuring a fiber orientation of +−45° with respect to the rotational axis of the load introduction element 6. Within the central body 16 a cylindrical and hollow roving package is placed. A metallic insert 24 is inserted within the hole of the hollow roving package. The compound is radially pressed and consolidated.

According to FIG. 14-17 corresponding features are referred to with the references of FIG. 1-13. For a method of manufacturing a grid type structure 1 of fiber composite structure a textured fiber composite layer 8 and a triangular foam core 9 with peripheral top faces 27 as supports are provided. Sheathing of said triangular foam core 9 with the textured fiber composite layer 8 to a triangular cell module 5 is accomplished by arranging by means of positioning elements 21 horizontally said textured fiber composite layer 8 on a resilient central lower stamp 17 and on a flange stamp 20 and a web stamp 22 arranged along side said resilient central lower stamp 17. The foam core 9 is fixed on the base 12 of said textured fiber composite layer 8 on the resilient central lower stamp 17.

The resilient central lower stamp 17 is pushed by means of an active upper central stamp 18 and the foam core 9 along the peripheral flange stamp 20 and the web stamp 22 such that the transverse web sections 10 and the flat cap sections 11 of said textured fiber composite layer 8 are pivoted by the separate peripheral flange stamp 20 and the web stamp 22 towards lateral faces 28 of the peripheral supports of said foam core 9. The transverse web section 10 of said textured fiber composite layer 8 is pressed by means of the separate lower peripheral web stamp 22 toward the lateral faces 28 of said foam core 9.

The upper separate peripheral flange stamp 20 is moved further toward the inside of the foam core 9 for pivoting and pressing the flat cap sections 11 of said textured fiber composite layer 8 by means of the upper peripheral web stamp 22 towards the top faces 27 of said foam core 9. External central stamps 19 are pressed against the flat cap sections 11 and the flat cap sections 11 and the transverse web sections 10 are heated for adhesive bond of said sections 10, 11 to the foam core 9 of the triangular cell module 5. Eventually the triangular cell module 5 is released by withdrawing the die parts 17-22.

REFERENCE LIST

1 grid element
2 upper layer
2a, 2b, 2c upper intersecting strips
3 lower layer
3a, 3b, 3c lower intersecting strips
4 skin sheet
5 cell modules
6 load introduction element
7 load introduction point
8 fiber composite layer
9 foam core
10 transverse web section
11 upper flat cap section
12 lower flat cap section/base
13 tripartite fiber composite layer
14 grid
15 lug
16 central body
17 central lower stamp
18 upper central stamp
19 external central stamp
20 flange stamp
21 positioning element
22 web stamp
24 metallic insert
25 layer sections
26 molds
27 top face
28 lateral face
29 bottom side
30 cell corners
31 roving package
32 lower hinge
33 upper hinge
34 outer section
35 central section
36 outer section

What is claimed is:

1. A grid type fiber composite structure with longitudinal stiffening elements oriented in at least two directions, comprising:
   a grid of polygon cell modules, each polygon cell module comprising:
      two parallel polygon surfaces connected by peripheral surfaces perpendicular to the two polygon surfaces; and
      at least three substantially u-shaped ribs, each rib having a transverse web section positioned along one of the peripheral surfaces and two flat cap sections integral with the transverse web section and each positioned along one of the respective polygon surfaces, at least one of the two flat cap sections extending only partially along one of the respective polygon surfaces;
      wherein a foam core is provided inside of and its peripheral edges are fully encased by the at least three substantially u-shaped ribs for support of the transverse web sections and the flat cap sections, the foam core being delimited by the two parallel polygon surfaces and the peripheral surfaces and the foam core being in contact with the transverse web sections and the flat cap sections of each rib; and wherein each of the cell modules is preassembled from the foam core and the ribs are made of fiber composite layer;

layers of intersecting strips; and a skin sheet;

wherein the polygon cell modules are joined together along respective transverse web sections of equal length such that there is substantially no longitudinal or transversal offset between the adjoining transverse web sections of two cell modules;

wherein the layers of intersecting strips are provided outside the flat cap sections on at least one of the polygon surfaces, the layers of intersecting strips being aligned with the ribs in one direction of the longitudinal stiffening elements, at least one of the flat cap sections being allocated between the at least one layer of intersecting strips and the foam core;

wherein the skin sheet is directly attached to the layers of intersecting strips and/or to the flat cap sections and/or to a base of the foam core; and wherein the longitudinal stiffening elements are provided by the polygon cell modules in cooperation with the layers of intersecting strips along the ribs.

2. The structure according to claim 1, wherein the cell modules are triangular with ribs oriented in three different directions.

3. The structure according to claim 1, wherein load introduction elements with radial lugs are provided at intersections of 8 or 12 ribs of adjacent cell modules.

4. The structure according to claim 3, wherein there is a reduced thickness of the ribs at the intersections to compensate for the material thickness of the load introduction elements.

5. The structure according to claim 3, wherein the load introduction elements are made of metal or of fiber composite.

6. The structure according to claim 1, wherein the skin sheet is mechanical releasable affixed to the cell modules at the intersections.

7. The structure according to claim 1, wherein the fiber composite layer is cut and textured.

8. The structure according to claim 1, wherein the fiber composite layer is a dry semi-finished part or a semi-finished part pre-impregnated with resin.

9. The structure according to claim 2, wherein the three ribs of each of the triangular cell modules are made of one tripartite fiber composite layer comprising three interconnected sections with two outer sections of the interconnected sections being pivotable relative to a central section.

10. The structure according to claim 2, wherein the three ribs of each of the triangular cell modules are made of one quadripartite fiber composite layer comprising three lateral sections connected alongside a triangular central section, the triangular central section comprising one of the flat cap sections and the three lateral sections being pivotable relative to the triangular central section.

11. A method of manufacturing the grid type fiber composite structure with longitudinal stiffening elements oriented in at least two directions according to claim 1, comprising:

providing textured fiber composite layers and polygon foam cores with peripheral supports, the polygon foam cores being delimited by two parallel polygon surfaces and by peripheral surfaces perpendicular to the two polygon surfaces;

sheathing each of the peripheral supports of the polygon foam cores with at least three substantially u-shaped ribs made of the textured fiber composite layers to provide polygon cell modules, each of the ribs having a transverse web section corresponding to one of the peripheral surfaces and two flat cap sections connected to the transverse web section, each of the two flat cap sections extending at least partially along one of the respective polygon surfaces;

joining together the polygon cell modules along respective transverse web sections of equal length to form a grid such that there is substantially no longitudinal or transversal offset between the adjoining transverse web sections of the cell modules;

inserting into the grid load introduction elements at intersections between at least four of the cell modules;

providing layers of intersecting strips;

attaching the layers of intersecting strips outside the flat cap sections in at least one of the polygon surfaces, each of the layers of intersecting strips being aligned with ribs in one direction of the longitudinal stiffening elements, at least one of the flat cap sections being allocated between the at least one layer of intersecting strips and the foam core;

providing the longitudinal stiffening elements by grid-wise mounting the cell modules to the layers of intersecting strips along the ribs;

providing a skin sheet;

and mounting the longitudinal stiffening elements onto the skin sheet.

12. The method according to claim 11, wherein sheathing is accomplished by arranging horizontally the textured fiber composite layer on a resilient central die part with separate peripheral die parts arranged alongside the resilient central die part, arranging the foam core on the textured fiber composite layer on the resilient central die part, pushing the resilient central die part along the peripheral die parts such that transverse web sections and flat cap sections of the textured fiber composite layer are pivoted by the separate peripheral die parts towards lateral faces of the foam core, pressing the transverse web sections of the textured fiber composite layer with the lower separate peripheral die parts towards the lateral faces of the foam core, pivoting and pressing the flat cap sections of the textured fiber composite layer with upper peripheral die parts towards the top faces of the foam core, heating the transverse web sections and the flat cap sections of the textured fiber composite layer with the peripheral die parts for adhesive bond of the ribs for a triangular cell module and releasing the triangular cell module.

* * * * *